(12) United States Patent
Andriolli et al.

(10) Patent No.: US 7,953,307 B2
(45) Date of Patent: May 31, 2011

(54) OPTICAL WAVEGUIDE HAVING BISTABLE TRANSMISSION STATES SUITABLE FOR OPTICAL LOGIC CIRCUITS

(75) Inventors: Nicola Andriolli, Rovigo (IT); Antonella Bogoni, Montova (IT); Luca Poti, Pisa (IT); Antonio Malacarne, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/442,290

(22) PCT Filed: Sep. 22, 2006

(86) PCT No.: PCT/EP2006/009253
§ 371 (c)(1),
(2), (4) Date: Sep. 25, 2009

(87) PCT Pub. No.: WO2008/034460
PCT Pub. Date: Mar. 27, 2008

(65) Prior Publication Data
US 2010/0033786 A1    Feb. 11, 2010

(51) Int. Cl.
*G02B 6/26* (2006.01)
*G02B 6/12* (2006.01)
(52) U.S. Cl. .................. 385/40; 385/14; 385/15
(58) Field of Classification Search .......... None
See application file for complete search history.

(56) References Cited

U.S. PATENT DOCUMENTS

| 6,741,640 | B1* | 5/2004 | Johnson | 375/219 |
| 7,010,189 | B2* | 3/2006 | Chi et al. | 385/24 |
| 2004/0104337 | A1* | 6/2004 | Tsuda | 250/227.14 |
| 2006/0109451 | A1* | 5/2006 | Lopez Torres et al. | 356/73.1 |

OTHER PUBLICATIONS

Ponzini, R. et al. "An Optical Memory Cell Based on Erbium-doped Fiber." Proceedings of 2005 IEEE/LEOS Workshop on Fibres and Optical Passive Components, Jun. 22-24, 2005, pp. 141-145.

* cited by examiner

*Primary Examiner* — Tina M Wong
(74) *Attorney, Agent, or Firm* — Coats & Bennett, P.L.L.C.

(57) ABSTRACT

An optical circuit comprises a bistable optical waveguide having first and second transmission states, and is more transmissive to light of a given wavelength in the second state than in the first state. First and second light sources emit light of first and second wavelengths, respectively, and are coupled to the waveguide at one end. Selectively transmitting a sufficient amount of light of the first wavelength through the waveguide switches the waveguide into the second state. Selectively transmitting a sufficient amount of light of the second wavelength through the waveguide switches it back to the first state. A sensing light source at the other end of the waveguide transmits a sensing light signal through the waveguide in the opposite propagation direction to that of light of the first and second wavelengths. A sensor detects the amount of the sensing light signal transmitted through the waveguide.

31 Claims, 4 Drawing Sheets

OPTICAL WAVEGUIDE HAVING BISTABLE TRANSMISSION STATES SUITABLE FOR OPTICAL LOGIC CIRCUITS

FIELD OF THE INVENTION

The present invention relates to optical circuits, typically multi- or bi-stable and to a method of operating such a circuit, in general, and in particular (but not exclusively) to the provision of a bistable optical circuit and an optical memory.

BACKGROUND OF THE INVENTION

In future photonic or optical networks including technologies such as optical packet switching, all-optical bistable devices (commonly known as "latches" or "flip flops") will be key elements to provide for packet buffering, self-routing and bit-length conversion. Few devices and architectures for all-optical bistable devices have been demonstrated, mainly based on the bistable operation of laser diodes and semiconductor optical amplifiers. In particular, some kinds of bistable laser diodes, such as vertical-cavity surface-emitting lasers (see H. Kawaguchi et al., "Pitchfork bifurcation polarization bistability in vertical-cavity surface-emitting lasers", Electron. Lett., vol. 31, no. 2, pp. 109-111, 1995) and coupled laser diodes (Y. Liu et al., "Three-state all-optical memory based on coupled ring lasers" IEEE Photon. Technol. Lett., vol. 15, no. 10, pp. 1461-1463, October 2003) have been investigated for the realisation of all-optical bistable devices. Furthermore, with the development of optical networks, it is desirable to develop all-optical memories.

By "light", "optical" and cognate terms herein, we not only refer to visible light, but also Infra Red (IR) and Ultra Violet (UV) light as is common in the art.

SUMMARY OF THE INVENTION

According to a first aspect of the present invention there is provided an optical circuit, comprising:

an optical waveguide having a first and a second state, the optical waveguide being more transmissive to light of a given wavelength in the second state than in the first state;

a first light source coupled to the optical waveguide, so as to selectively transmit light of a first wavelength through the optical waveguide; and a second light source coupled to the optical waveguide, so as to selectively transmit light of a second wavelength through the optical waveguide, in which transmission of the first wavelength light through the optical waveguide causes the optical waveguide to be in the second state, and transmission of the second wavelength light causes the optical waveguide to be in the first state;

the optical circuit further comprising a test light source, arranged to transmit a test light signal of the given wavelength through the optical waveguide, and an output for the test light signal after it has passed through the optical waveguide, in which the test signal is coupled to the optical waveguide such that, in use, the test optical signal counter-propagates to at least one of the first and second optical signals.

Accordingly, it is possible to set the optical waveguide into a given state and then determine by means of the test signal, typically at some later time, what state the optical waveguide is in. The optical circuit may therefore "remember" which state it is in in so as to provide a novel multistable or bistable optical circuit—which could be considered an "optical latch" or "optical flip-flip". Furthermore, it may be possible to use such a circuit as an optical memory. The counter-propagation of the test signal is a simple and reliable way to be able to separate the test signal from the light emitted by the first and second sources.

When acting as a latch or flip-flop, transmission of the light from the first light source may act as a "set" signal, whereas transmission of the light from the second light source may act as a "reset" signal. When acting as a memory, transmission of the light from the first light source may act as a "write" signal, whereas transmission of the light from the second light source may act as a "clear" signal. In each case, the logic high or "1" state may be considered to be the more transparent state of the optical waveguide (where the light from the test light source can successfully traverse the optical waveguide) whereas the logic low or "0" state may be considered to be the less transparent state of the waveguide (where the light from the test light source would not be able to as successfully traverse the optical waveguide).

Accordingly, the level at which the test light signal is output may be used as the output of the circuit. The output may comprise a sensor for sensing the level of the test light signal after it has passed through the optical waveguide. Alternatively, it may simply provide an optical coupling for coupling the test light signal to at least one further optical circuit, hence possibly providing an all-optical circuit.

The optical waveguide typically comprises an optical fibre, although it is also envisaged that it could comprise a waveguide integrated onto a MMIC or other integrated circuit. In the preferred embodiment, the optical waveguide comprises a doped transmission medium typically doped with Erbium (Er) and optionally Ytterbium (Yb). Indeed, the optical waveguide may comprise or consist of an Er—Yb doped optical fibre.

Using an Er—Yb doped transmission medium makes use of the absorption and stimulated emission characteristics of such a medium. By appropriate choice of the energy levels of the ions in the medium (typically, by choosing the amounts and ratios of the Erbium and Ytterbium dopants), it is possible to define the first and second states as defined above. The first wavelength can then be chosen such it is close to the maximum absorption of the medium (typically due to Erbium), typically so as to increase the energy of ions in the medium and to place the medium into a more transmissive state, whereas the second wavelength can be chosen to be one where stimulated emission dominates in the medium, typically decreasing the energy of ions in the medium and placing the medium in a more absorptive state. The first wavelength may be substantially 1535 nm, typically 1535.8 nm, and the second substantially 1565 nm, or substantially 1568.0 nm.

In order to change the optical waveguide from first to second states or vice versa, the first and/or second signals may only need to be pulses; the first and second optical sources may therefore be arranged to transmit such pulses. The pulses may have a pulse width of the order of 10 ns; preferably the pulses are of sufficient strength and duration to cause the majority of ions in the waveguide to switch between energy levels corresponding to the two states. The fibre will most preferably hold whichever state it was in last for a period after the application of a pulse; this period may be at least a microsecond, possibly at least 10 or even 20, 30, 40 or 50 microseconds. This is most desirable for use as an optical latch or flip-flop.

The test signal can be, and advantageously is, very much smaller in terms of transmitted power, than the light emitted by the first and second light sources. The power of the test signal may be at most 10%, 1%, 0.1% or 0.01% of the peak power transmitted by the first or second light sources. Keeping the test signal at a low power is firstly efficient use of power and secondly avoids inadvertently changing the state of the optical waveguide. Preferentially, the test signal is of a different wavelength to the first and/or second wavelengths, and may be substantially 1541 nm, or 1550.9 nm.

In one embodiment, the test light source comprises spontaneous emission from the transmission medium. Alternatively, the test light source may be a light source distinct from the transmission medium but coupled thereto. It may comprise a laser.

The optical waveguide preferably has a first and a second end. The first and second optical sources may be coupled to the first end of the optical waveguide, whereas the test optical source may be coupled to the second end of the optical waveguide.

The circuit may further comprise an optical circulator coupled to the first end of the optical waveguide. This circulator may have first, second and third ports, the first port being coupled to the first and second light sources, the second to first end of the optical waveguide and the third to the sensor. As is common with circulators, the circulator may be arranged such that a signal incident on the first port is transmitted on the second port and a signal incident on the second port is transmitted on the third port. Typically, a signal incident on the third port may be transmitted on the first port, but that is not of great importance for the present invention.

Accordingly, the light emitted by first and second light sources can be transmitted down the optical waveguide from the first end towards the second end, whilst the test signal can be transmitted from the second end to the first end and then directed towards the sensor. Given that the test signal may be very much smaller than the light emitted by the first or second light sources, this is a simple and reliable way to separate the test signal from the light emitted by the first and second sources.

Furthermore, the optical circuit may be further provided with an isolator at the second end of the optical waveguide, arranged to discard (typically by absorption) light transmitted from first to second ends but to allow transmission of light into the second end for transmission via the optical waveguide to the first end. Accordingly, the isolator may allow the test light signal to be introduced at the second end, but to discard the light transmitted by first or second signals after it has traveled along the optical waveguide. This protects the test light source from damage.

The first and second light sources may be coupled together by means of a coupler. The coupler typically combines the light transmitted by both sources and transmits that to the optical waveguide, possibly by means of the circulator, if such is provided. Alternatively, a further coupler may be provided, arranged such that, in use, signals received from the optical waveguide are passed to the output at a first port of the further coupler, but signals incident on a second port of the further coupler are passed to the optical waveguide with minimal cross-talk to the output. The first port may be connected to the output, whereas the second port may be connected to the coupler. A uni-directional isolator may be provided between the second port and the coupler, to only allow signals to pass in the direction from the coupler to the further coupler.

According to a second aspect of the present invention there is provided a method of operating an optical circuit, the optical circuit comprising an optical waveguide having a first and a second state, the optical waveguide being more transmissive to light of a given wavelength in the second state than in the first state, the method comprising:

in order to switch the optical waveguide from the first state to the second state, transmitting light of a first wavelength through the waveguide;

in order to switch the optical waveguide from the second state to the first state, transmitting light of a second wavelength through the waveguide;

in order to determine which of the first or second states the waveguide is in, transmitting a test signal through the waveguide and determining how much of the test signal is transmitted through the optical waveguide.

The step of determining how much of the test signal is transmitted may comprise the step of measuring the amplitude or power of the test signal once it has traversed the optical waveguide. The determination of how much of the test signal is transmitted may be a simple relative test; a "low" transmitted amplitude or power may signify that the waveguide is in the first state, whereas a "high" transmitted amplitude may signify that the waveguide is in the second state.

Typically, the optical waveguide comprises an optical fibre, although it is also envisaged that it could comprise a waveguide integrated onto a MMIC or other integrated circuit. In the preferred embodiment, the optical waveguide comprises a doped transmission medium typically doped with Erbium (Er) and optionally Ytterbium (Yb). Indeed, the optical waveguide may comprise or consist of an Er—Yb doped optical fibre.

The steps of changing the optical waveguide from first to second states or vice versa may comprise transmitting a pulse of the first or second wavelength as appropriate. The pulse may have a pulse width of the order of 10 ns; preferably the pulse is of sufficient strength and duration to cause the majority of ions in the waveguide to switch between energy levels corresponding to the two states. The fibre will most preferably hold whichever state it was in last for a period after the application of a pulse; this period may be at least a microsecond, possibly at least 10 or even 20, 30, 40 or 50 microseconds. This is most desirable for use as an optical latch or flip-flop.

The step of transmitting the test signal advantageously comprises transmitting a signal which is very much smaller in terms of transmitted power than the light emitted at first and second wavelengths when changing the state of the waveguide. The power of the test signal may be at most 10%, 1%, 0.1% or 0.01% of the peak power at first or second wavelength. Keeping the test signal at a low power is firstly efficient use of power and secondly avoids inadvertently changing the state of the optical waveguide. Preferentially, the test signal is of a different wavelength to the first and/or second wavelengths, and may be substantially 1541 nm.

The method may comprise use of an optical circuit according to the first aspect of the invention. The method may make use of any of the optional features described with respect to that first aspect.

BRIEF DESCRIPTION OF THE DRAWINGS

The present invention will be understood and appreciated more fully from the following detailed description taken in conjunction with the drawings in which.

DESCRIPTION OF AN EMBODIMENT OF THE INVENTION

Figure 1:
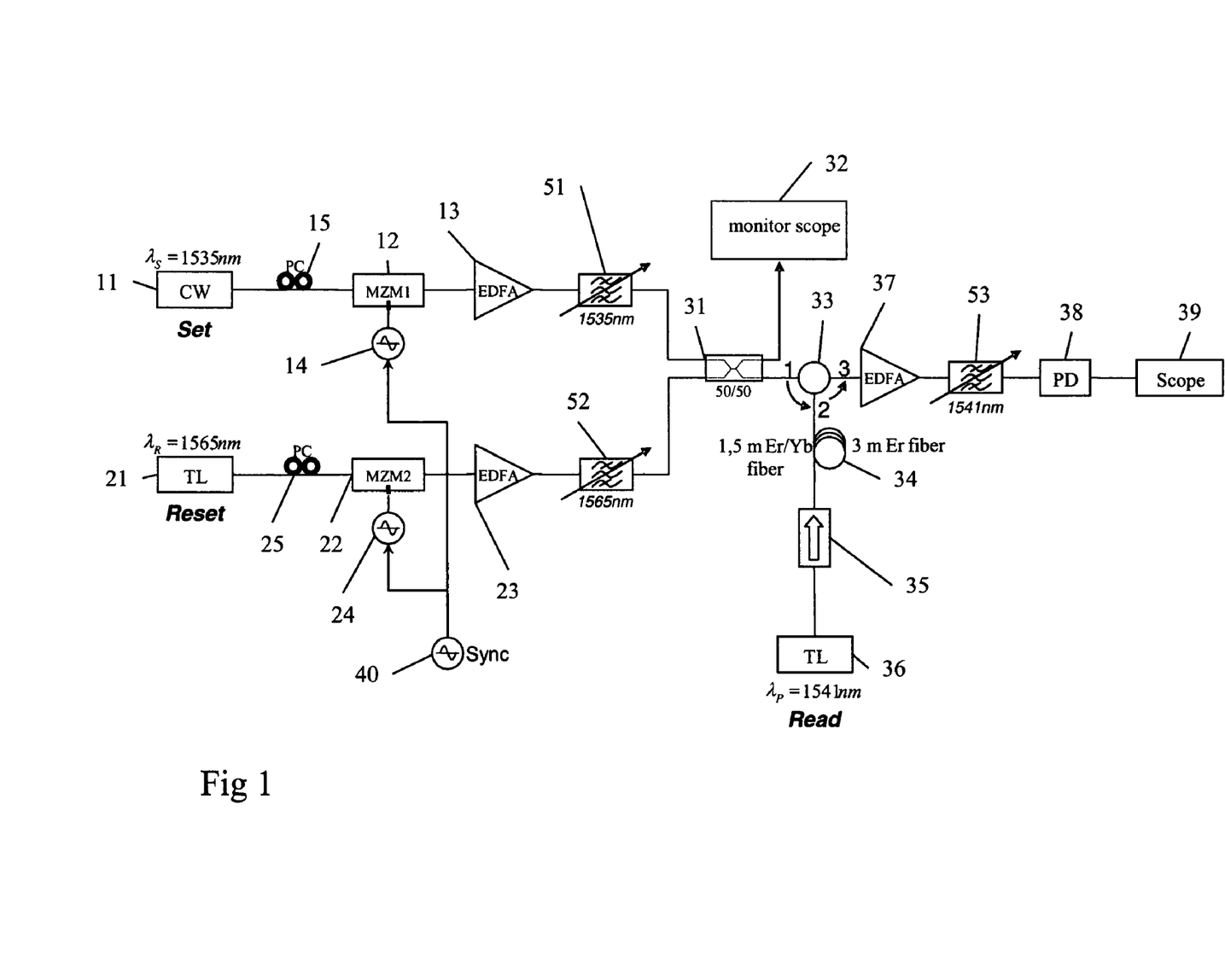
FIG. 1 is a diagram illustrating an optical circuit according to one embodiment of the present invention.

An optical circuit forming a first embodiment of the invention is shown in FIG. 1. A first signal continuous wave signal generator 11 having a first wavelength $\lambda_S$ of 1535 nm is used to generate the first signal. This signal can be considered to be the flip-flop "set" signal. The first signal is pulsed using a programmable electric wave generator 14 and a Mach Zender Modulator (MZM) 12. The first signal is amplified by means of an Erbium Doped Fibre Amplifier (EDFA) 13 up to 23 dBm (200 mW). The modulation efficiency of the MZM 12 is polarization dependent so a Polarization Controller (PC) 15 is inserted into the signal path just before the MZM 12.

In the same way, the second signal, forming the reset for a flip-flop signal, is generated through a tunable laser 21 having second wavelength $\lambda_R$ of 1565 nm. The signal thus generated is modulated by a second MZM 22 under the control of a second electric wave generator 24 and amplified by means of a second EDFA 23 up to 23 dBm (200 mW). A second PC 25 is inserted into the signal path just before the second MZM 22. The two electronic wave generators 14, 24 are linked by a synchronisation generator 40 so that the timings of "set" and "reset" pulses can be controlled relative to one another.

The first and second signals are then coupled together by means of 50:50 coupler 31. This outputs at two separate ports a 50:50 mixture of the first and second signals; an oscilloscope 32 can be attached to one port for diagnostic purposes. The other port is coupled to a circulator 33 having three ports. The first and second signals are provided at the first port of the circulator, and are transmitted by the circulator to its second port.

The second port of the circulator, and hence the first and second signals are coupled to into a first end of 1.5 m of Erbium-Ytterbium doped fibre 34, forming the optical waveguide of the present invention. The fibre is arranged such that, for a given wavelength, the first signal (at the first wavelength) will cause the fibre 34 to become relatively transparent—the second state of the fibre—whereas the second signal (at the second wavelength) will cause the fibre 34 to become relatively opaque—the first state of the fibre.

The second end of the fibre 34 is terminated by an isolator 35. This allows signals to travel only into, and not out of, the fibre 34 at the second end. Accordingly, the first and second signals will be absorbed by the isolator 35 after they have traversed the fibre 35.

Attached to the isolator 35 is a test signal source 36 comprising a further tunable laser. This is generated as a continuous wave at a test signal wavelength of $\lambda_P$=1541 nm even though it is, in principle possible to transmit this signal across the entire bandwidth of the fibre 34. The test signal wavelength corresponds to the given wavelength discussed above.

The isolator 35 therefore allows the introduction of the test signal into the fibre whilst absorbing the first and second signals. The test signal will be launched into the fibre 34 in a counter-propagating sense relative to the first and second signals. Once the test signal has traversed the fibre, it reaches the circulator 33. The circulator transmits the test signal to its third port, where it is amplified by a low noise preamplifier 37, and for visualisation purposes photodetected by a photodetector 38 to convert it into an electrical signal, which is displayed on an oscilloscope 39.

To decrease noise, the circuit can be provided with bandpass filters to restrict the wavelengths travelling down a certain branch to only those that should be passing down that branch. In the circuit shown in FIG. 1, filters 51, 52, and 53 are provided; filter 51 ensures that the first signal only comprises wavelengths around the first wavelength 1535 nm, filter 52 similarly ensures that the second signal comprises only wavelengths around the second wavelength 1565 nm and filter 53 ensures that only signals having a wavelength around that of the test signal (1541 nm) pass to be detected by the photodetector 38.

Figure 2:
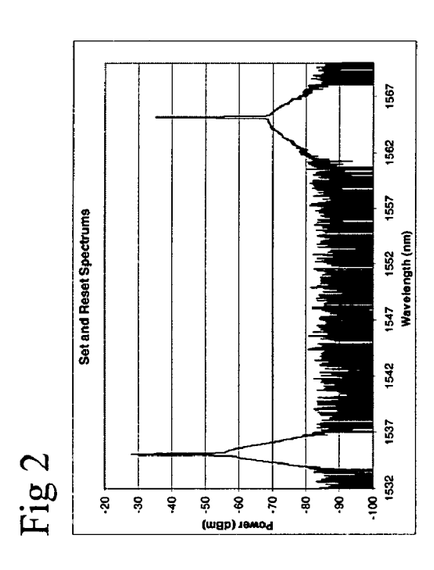
FIG. 2 is a graph showing the spectra of the "set" and "reset" pulses used in the optical circuit of FIG. 1.
Figure 3:
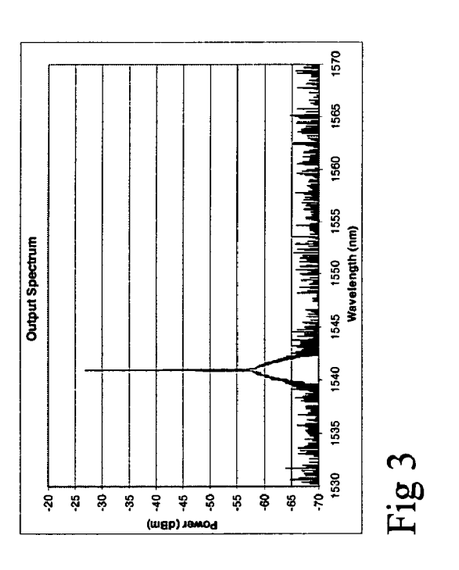
FIG. 3 is a graph showing the spectra of the test signal used in the optical circuit of FIG. 1.

FIG. 2 shows the spectra of the first or "set" signal (left-hand peak) and of the second or "reset" signal (right-hand peak). FIG. 3 shows the spectrum of the test signal before it is introduced into the fibre 34.

Figure 4:
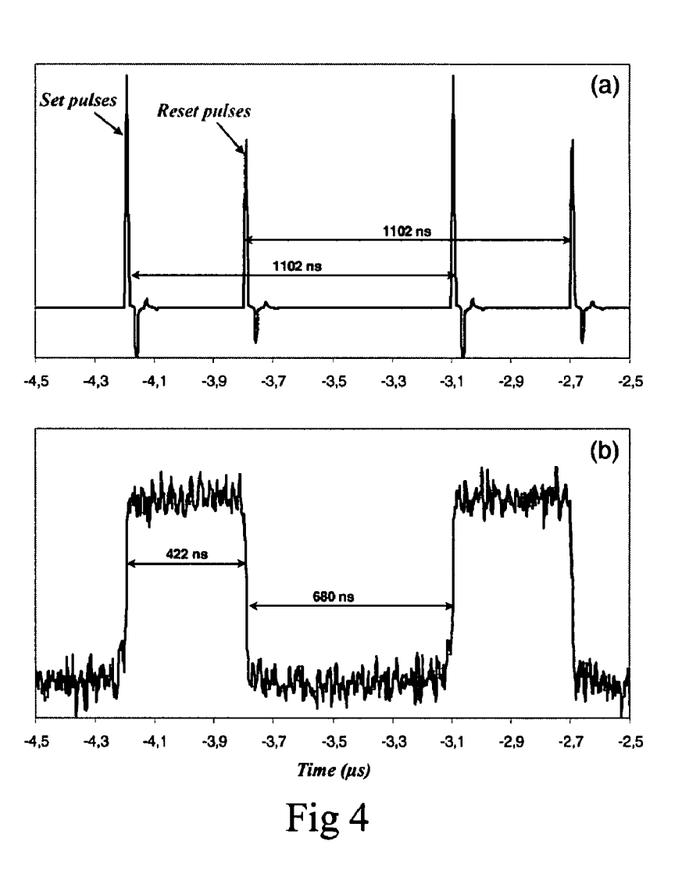
FIG. 4a shows the timing of the application of the pulses of FIG. 2 to the optical circuit of FIG. 1.
FIG. 4b shows the resultant measured test signal after it has been transmitted through the optical fibre of FIG. 1.

The operation of the optical circuit can be demonstrated with FIGS. 4a and 4b. These Figures schematise a periodic flip-flop operation showing in FIG. 4a the relative timings of input set (first signal) and reset (second signal) pulses and in FIG. 4b the output test signal as visualised at oscilloscope 39. The repetition frequency of set and reset pulses trains is approximately 900 KHz both with a pulsewidth of 10 ns. Considering the power of set and reset signals at the fibre 34 input (port 2 of the circulator 33), we obtain a peak power of greater than 30 dBm (1 W) for both set and reset pulses, thus result in a set pulse energy $E_S$=18.48 nJ and reset pulse energy $E_R$=19.82 nJ.

When a "set" signal is transmitted, a signal of the first wavelength is transmitted through the fibre 34. This causes ions in the fibre 34 to become excited and cause the fibre to become more transparent to light of the wavelength of the test signal—the second state of the fibre 34. This can be seen in FIGS. 4a and 4b, where a "set" pulse causes the output test signal to increase in amplitude. Applying a "reset" signal of the second wavelength to the fibre 34 causes the ions to lose energy and descend into the lower of the two states. Accordingly, the transparency of the fibre 34 decreases at the wavelength of the test signal (the fibre enters the first state) and so the amplitude of the output test signal decreases. Accordingly, the system has two stable states and will remember which of "set" and "reset" occurred last. The circuit therefore operates as an all optical latch or "flip-flop".

In the example shown, the second states was maintained for a period of 422 ns, but this level can be considered constant even for dozens of microseconds because of slow decay of excited ions through spontaneous emission. Both transition times are approximately 10 ns, because both up- and down-conversion of ions completely exploits the energy of set and reset pulse energy. By increasing the power of set and reset pulses and decreasing their pulsewidth, it is possible to speed up rising and falling edge times. High-level memorization times of up to dozens of microseconds have been measured.

FIG. 4b has been obtained with a reading input power of −12 dBm (62.5 µW): increasing the reading power up to 0 dBm (1 mW) it is possible to obtain lower Optical Signal to Noise Ratio (OSNR) and an higher value for the difference in measured output test signal amplitudes between the states. In such a case the amplitude of the lower state increases, maintaining almost constant the contrast ratio between the two states and therefore the possibility to distinguish high and low energy levels.

Figure 5:
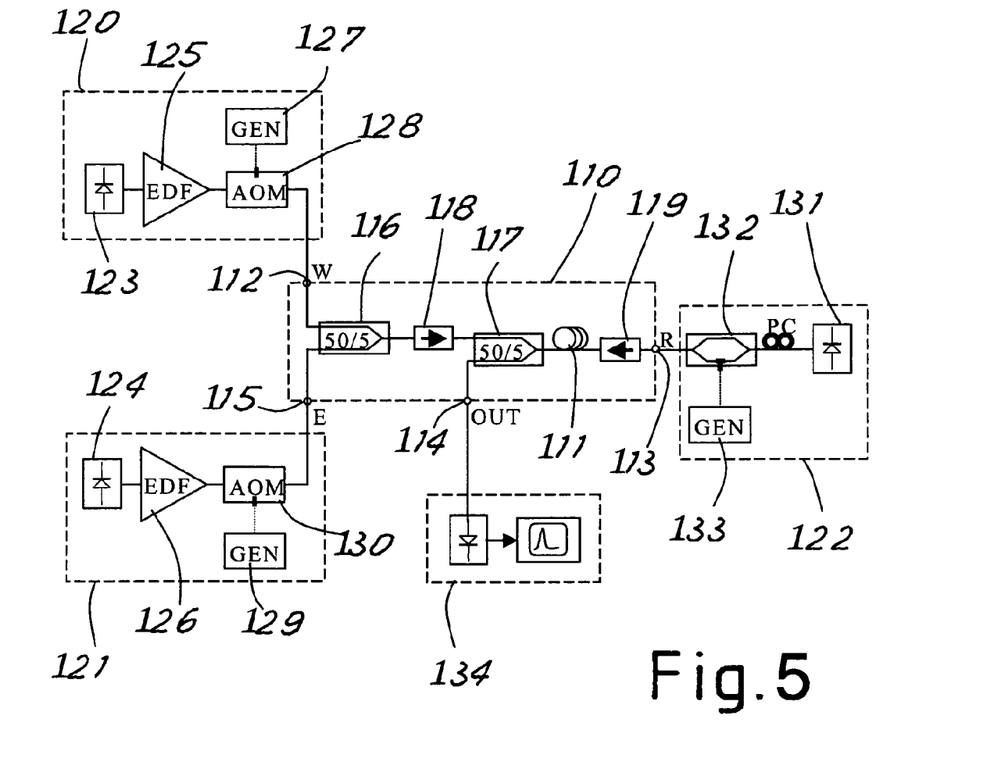
FIG. 5 shows a diagram of an all-optical memory realized in accordance with a second embodiment of this invention and inserted in a test circuit.
Figure 6:
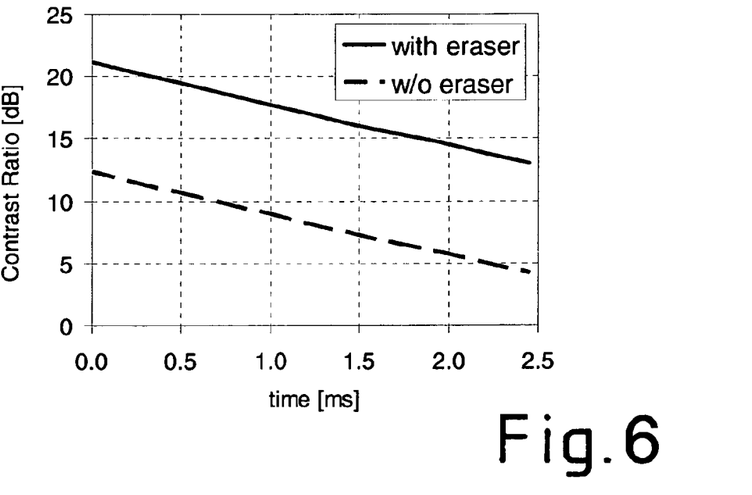
FIG. 6 shows graphs of contrast ratios in optical means as a function of the time elapsed after a writing.
Figure 7:
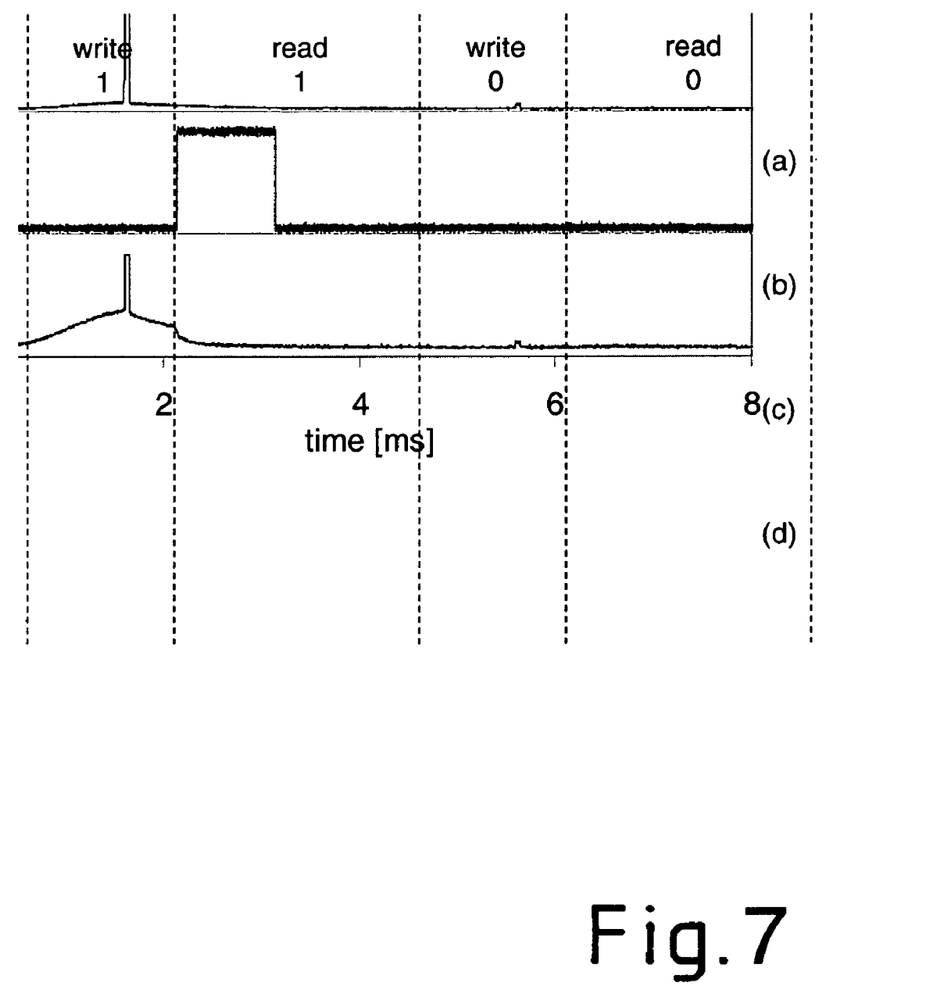
FIG. 7 shows temporal diagrams of reading writing, erasing and output signals in the memory in accordance with this invention.

With reference to FIGS. 5 to 7, FIG. 5 shows diagrammatically a memory in accordance with a second embodiment of this invention designated as a whole by reference number 110 and inserted in a test circuit.

In accordance with the principles of this invention, the memory 110 utilizes the property of an energy-storing erbium-doped optical fibre 111. This can be considered as a form of optical waveguide. In the experimental realization, the use of 10 m of fibre was found advantageous.

The operating principle is as follows.

Consider a two-level energy system for the erbium-doped fibre 111. If an optical signal with appropriate energy spreads through the means, it is absorbed with a probability that depends on the number of ions populating the energy levels and on the absorption cross-section of the fibre. When the signal is absorbed, the ions are transferred to the excited level. At the same time, a spontaneous and stimulated emission can occur with a probability closely linked to the input energy intensity, to the emission cross sections, and to the number of excited ions. By increasing the input energy, the process reaches a condition of equilibrium and the input energy is completely transferred to the output.

In this manner, it is possible to define two work conditions, to wit, absorption and transparency. In particular, the binary number 1 can be associated with the state of transparency of the erbium-doped fibre and the binary number 0 with the absorption state of the same means without excitement.

The memory state can be verified by injecting a reading signal or a low-power test signal into the fibre 111. If it reaches the output port, the stored bit is 1, or if it is completely absorbed, the stored bit is 0. The writing of a 1 can be obtained using a high-energy optical impulse at a wavelength near maximum absorption of the erbium. The excited state of the erbium decays in a few milliseconds, showing a behaviour similar to the discharge of a condenser in an electric Dynamic Random Access Memory (DRAM). If the memory cell needs to be erased, a suitable erasing impulse at a wavelength where the stimulated emission dominates takes the excited erbium ions down to the minimum energy state. The advantages of this architecture are a long storing time (up to the order of the millisecond) and the possibility of reading the cell at any time (rather than at fixed instants as happens with Fibre Delay Lines). Moreover, structures based on Er—Yb waveguides suited to being integrated can be devised, reducing the imprint and the cost of the optical memory.

The contrast ration (CR) of the memory is defined as follows:

$$CR[dB] = 10\log_{10}\left(\frac{V_1}{V_0}\right),$$

where $V_1$ is the voltage referred to the reading signal received when a bit 1 is stored, while $V_0$ is the voltage caused by the not ideal absorption of the reading signal when a bit 0 is stored. CR represents directly the capability of discriminating two bits; high CR values are desirable during all the reading time. Because of the lifetime of the erbium ions, the value read associated with a 1 decreases exponentially in time. It is possible to give the performance of the memory cell in CR terms at the highest value for the signal read immediately after the writing of a 0.

CR is measured as a function of the temporal position of the reading signal with regard to the impulse that writes a 1. The broken line in FIG. 6 shows a decrease in the CR in time from 12.3 dB to 4.2 dB. These values can be not high enough to allow recognizing two different bits. In addition, it takes a long time to erase the memory cell if one waits only for spontaneous emission. For these reasons, an erasing signal capable of stimulating emission is used so as to reduce the excited ions responsible for the fibre transparency. By using the erasing signal, the straight line of the contrast ratio shifts upward (solid line of FIG. 6) so that in the storing time the relationship is always kept above 13 dB (in this case it varies between 13 dB and 21 dB).

A device in accordance with this invention comprises a memory cell 110 shown by way of example in FIG. 5 and comprising in turn an input 112 for the a first optical "writing" signal and an input 113 for the reading or "test" optical signal. The memory state is detectable at an optical output 114.

The reading signal is advantageously launched through the fibre 111 counter-propagating as regards the writing signal. In this manner, an optical filter is not necessary and the proposed solution is thus simpler and more economical.

There is also advantageously an input 115 for a second "erasing" optical signal. In the realization shown in FIG. 5 the erasing signal was chosen co-propagating with the writing signal.

To insert the writing and erasing signals and to extract the output signal, two known couplers 116, 117 arranged in cascade at one end of the fibre 111 were used. The first is connected to the writing and erasing input and the second receives the signal output from the first to send it to the fibre and extract the output signal. Advantageously, to prevent that from the inputs might come out return signals that could cause unsteadiness in the lasers and optical amplifiers connected thereto, two known optical insulators 118, 119 were used with one arranged in series with the reading input 113 (with propagation direction from the input to the optical fibre) and the other arranged between the output of the input coupler 116 and the output coupler 117 and propagation direction from the coupler 116 to the coupler 117.

For the operational tests, the memory 110 is connected to two optical sources 120, 121 of impulses having power and duration sufficiently high to emit impulses of suitable energy to produce the writing and erasing effects in the doped optical means 111 and to a source 122 of impulses having power and duration sufficiently low to produce the reading impulses without alteration of the memory state.

In the example, to obtain the reading and writing signals, two continuous wave laser sources 123, 124 are amplified by respective erbium Doped Fibre Amplifiers (EDFA) 125, 126 to then be modulated. In particular, for the writing signal an $\lambda_w=1535.8$ nm continuous wave laser 123 optically amplified by means of the EDFA amplifier 125 up to 27 dBm is used. Modulation of the writing signal is obtained by using a programmable wave generator 127 and an acoustic optical modulator (AOM1) 128.

In the same manner, the erasing signal is generated with the $\lambda_e=1568.0$ nm laser 24 amplified up to 25 dBm by the EDFA 126 and modulated using a programmable wave generator 129 and an acoustic optical modulator (AOM2) 130.

The reading signal is also generated by a continuous laser source 131 modulated by means of a modulator 132 controlled by a programmable wave generator 133.

In this experiment the wavelength of the reading signal is $\lambda_R=1550.9$ nm even though, as a principle, it can be tuned over the entire band of the erbium fibre. Lastly, the reading signal at the output 114 is photo-detected and viewed through an oscilloscope 134. It was found advantageous that the test signal impulse has energy between 600 nJ and 800 nJ.

FIG. 7 diagrams a two-bit storing operation showing the writing signal (a), the reading signal (b) without erasing, the erasing signal (c), and the reading signal (d) when erasing is used.

As may be seen in FIG. 7, at first a binary FIG. 1 is written using a rectangular impulse with temporal duration of $T_w$=1.5 ms (FIG. 7a).

It was found useful that the writing impulse have more that 600 mJ of energy and preferably around 752 µJ. In FIG. 7 the impulse has impulse energy of $E_W$=752 µJ. The cell keeps the bit for a time not longer than 2.5 ms when the second bit must be written or the same bit refreshed. In FIG. 7, a 0 is written (that is, no new writing impulse is inserted) after 2.5 ms from the writing of a 1.

The value of the bit is read using a rectangular impulse of 50 µs. FIG. 7(b) shows the impulse detected in output to the memory without the use then of an erasing signal. A certain pedestal can be observed under the impulse because of the spontaneous emission that falls within the output filter band. This pedestal decreases slowly and lowers the CR.

The erasing impulse was found useful between 300 µJ and 600 µJ and preferably around 316 µJ. FIG. 7(c) shows an erasing signal with temporal duration of approximately 1 ms and associated energy $E_E$=316 µJ.

The signal read in this case is traced in FIG. 7(d) where the pedestal was emphasized to throw light on the erasing signal effect. As seen, the erasing impulse strongly depopulates the second energy level while considerably increasing the CR, as shown in FIG. 6, so that, with the erasing signal, the CR is held between 13 dB and 21 dB.

Thanks to the use of an optical memory cell based on an optical means (in particular, a silica fibre) doped with erbium, an efficient completely optical memory is obtained representing another promising building block for climbing over the gap between all-optical and electrical packet switching. Thanks to the introduction of an erasing signal, erasing of the memory was speeded up and the contrast ratio (CR) was considerably increased so as to have a clear and well distinguishable distinction between bit 1 and bit 0. In the experimental device, it was possible to measure refresh times of approximately 2.5 ms and CR between 21 dB and 13 dB. This opens new frontiers towards storing of the light in erbium-doped waveguides.

It can be seen that optical circuits according to the present invention are advantageous even if the medium is so much efficient (both Er and Er/Yb doped fibre are not optimised for such applications). Better results would be obtained using a medium whose absorption cross-sections are negligible with respect to emission cross sections in the reset region (or in a spectral region where the reset signal can be allocated).

The invention claimed is:

1. An optical circuit, comprising:
an optical waveguide having a first state and a second state, the optical waveguide being more transmissive to light of a given wavelength in the second state than in the first state;
a first light source coupled to the optical waveguide, and configured to selectively transmit a first optical signal comprising light of a first wavelength through the optical waveguide to place the optical waveguide in the second state;
a second light source coupled to the optical waveguide, and configured to selectively transmit a second optical signal comprising light of a second wavelength through the optical waveguide to place the optical waveguide in the first state;
a test light source configured to inject a test light signal of the given wavelength into the optical waveguide such that the test light signal counter-propagates through the optical waveguide relative to the first and second optical signals;
an output configured to output the test light signal after it has traversed the optical waveguide; and
wherein the output and test light source are located on opposite sides of the optical waveguide, and wherein the output is located on the same side of the optical waveguide as the first and second light sources.

2. The circuit of claim 1 wherein the output comprises a sensor configured to sense a level of the test light signal after it has traversed the optical waveguide.

3. The circuit of claim 1 wherein the output comprises an optical coupler configured to couple the test light source to at least one further optical circuit.

4. The circuit of claim 1 wherein the optical waveguide comprises an optical fiber.

5. The circuit of claim 1 wherein the optical waveguide comprises a waveguide integrated onto an integrated circuit.

6. The circuit of claim 1 wherein the optical waveguide comprises a doped transmission medium.

7. The circuit of claim 6 wherein the transmission medium is doped with Erbium (Er).

8. The circuit of claim 6 wherein the transmission medium is doped with Ytterbium (Yb).

9. The circuit of claim 1 wherein the first and second optical sources are configured to generate pulses of light.

10. The circuit of claim 9 wherein the pulses have a pulse width of about 10 ns.

11. The circuit of claim 9 wherein the optical waveguide is configured to remain in its previous state for a period of time after the generation of a pulse.

12. The circuit of claim 11 wherein the period of time is between about one microsecond and about 50 microseconds.

13. The circuit of claim 1 wherein the test light source transmits the test light signal at a power that is lower than the powers at which the first and second light sources transmits their respective first and second optical signals.

14. The circuit of claim 1 wherein the test optical signal has a wavelength that is different than at least one of the first and second wavelength.

15. The circuit of claim 1 wherein the test light source comprises a spontaneous emission from the transmission medium.

16. The circuit of claim 1 wherein the test light source comprises a light source that is distinct from the transmission medium, but is coupled to the transmission medium.

17. The circuit of claim 16 in which the test light source comprises a laser.

18. The circuit of claim 1 wherein the optical waveguide has a first end and a second end, and wherein the first and second light sources are coupled to the first end of the optical waveguide, and the test optical source is coupled to the second end of the optical waveguide.

19. The circuit of claim 18 further comprising an optical circulator coupled to the first end of the optical waveguide, the optical circulator comprising:
first, second and third ports;
the first port being coupled to the first and second light sources;
the second port being coupled to the first end of the optical waveguide; and
the third port being coupled to the optical circuit output.

20. The circuit of claim 19 further comprising an isolator disposed at the second end of the optical waveguide, and configured to:
- discard light transmitted from the first end to the second end; and
- allow transmission of light into the second end for transmission via the optical waveguide to the first end, so as to allow the test light signal to be introduced at the second end, and discard the light transmitted by first or second optical sources after the light has traveled along the optical waveguide.

21. A method of operating an optical circuit, the optical circuit including an optical waveguide having a first and a second state, and configured to be more transmissive to light of a given wavelength in the second state than in the first state, the method comprising:
- transmitting light of a first wavelength through the waveguide to switch the optical waveguide from the first state to the second state;
- transmitting light of a second wavelength through the waveguide to switch the optical waveguide from the second state to the first state;
- transmitting a test signal through the waveguide and determining how much of the test signal is transmitted through the optical waveguide to determine whether the optical waveguide is in the first state or the second state; and
- wherein the test light signal is transmitted to counter-propagate through the optical waveguide relative to the first and second optical signals.

22. The method of claim 21 wherein determining how much of the test signal is transmitted through the waveguide comprises measuring at least one of an amplitude and a power of the test signal once it has traversed the optical waveguide.

23. The method of claim 21 wherein transmitting light of a first wavelength to switch the optical waveguide into second state comprises transmitting a pulse of light of the first wavelength, and wherein transmitting light of a second wavelength to switch the optical waveguide into first state comprises transmitting a pulse of light of the second wavelength.

24. The method of claim 23 wherein the pulses have a width of about 10 ns.

25. The method of claim 23 wherein the pulses of light are of sufficient strength and duration to cause a majority of ions in the optical waveguide to switch between energy levels that correspond to the two states.

26. The method of claim 23 wherein the optical waveguide maintains a previous state for a period of time after the application of a pulse.

27. The method of claim 26 wherein the period of time is between about a microsecond and about 50 microseconds.

28. The method of claim 21 wherein transmitting the test signal comprises transmitting the test signal at a power that is lower than a power at which the light is emitted at first and second wavelengths when switching the state of the waveguide.

29. The method of claim 28 wherein the test signal transmit power is between about 0.01% and about 10% of the peak power at first or second wavelength.

30. The method of claim 21 wherein the test light source comprises spontaneous emission from the transmission medium.

31. The method of claim 21 wherein the test light source comprises a light source distinct from the transmission medium but coupled thereto.

* * * * *